Oct. 16, 1956   D. E. BENNETT   2,766,563
BUFFING AND SHAPING MACHINE FOR TIRES AND THE LIKE
Filed June 13, 1952   2 Sheets-Sheet 2

INVENTOR.
Dan E. Bennett
BY Wilkinson, Huxley,
Byron & Hume
ATTYS

United States Patent Office 2,766,563
Patented Oct. 16, 1956

2,766,563

BUFFING AND SHAPING MACHINE FOR TIRES AND THE LIKE

Dan E. Bennett, Milan, Ill.

Application June 13, 1952, Serial No. 293,307

3 Claims. (Cl. 51—179)

This invention relates to a buffing or grinding machine and more particularly to such a machine which is adapted for use in truing up a vehicle tire and improving the running balance thereof.

Motor vehicles travel at such relatively high speeds today that even a very small "high" spot on a tire of such a vehicle will often cause a noticeable vibration. The removal of even as little as one ounce of rubber will sometimes eliminate a very annoying sound and vibration.

It is therefore an object of this invention to provide a tire buffing or grinding machine which is adapted to be utilized in conjunction with a vehicle tire which is still in place on the wheel of the vehicle.

It is also an object of this invention to provide a device or machine of the character described which is relatively simple in construction and operation and yet which does a very effective job of truing a tire.

Still another object is to provide such a machine which is adapted to actually support a portion of the weight of the vehicle with which the tire to be trued is associated, so that the vehicle itself holds the machine in exact alignment with the tire being treated.

A further object is to provide such a machine which has a buffing or grinding wheel, and the driving mechanism therefor, mounted as a unit, which unit can be moved through an arcuate path so that the grinding or buffing wheel will give the surface of the tire being treated a perfectly symmetrical configuration.

Still another object of this invention is to provide a machine of the character described which utilizes the frame or body of the vehicle, with which the tire to be treated is associated, as a point of reference during the truing operation. This in turn insures that the tire, once having been balanced, will remain in that condition when the vehicle is put in operation, since there has been no variation introduced by the remounting of the wheel, or the like.

Further objects and advantages of this invention will become evident as the description proceeds and from an examination of the accompanying drawings which illustrate one embodiment of the invention and in which similar numerals refer to similar parts throughout the several views.

In the drawings:

Figure 3 is a plan view from below of a fragmentary portion of the motor plate showing the manner in which the rollers are associated therewith;

Figure 4 is an end view of the vertical adjustment mechanism of the machine shown in Figure 1, the view being taken looking toward the left of the machine as shown in Figure 1.

Figure 1:
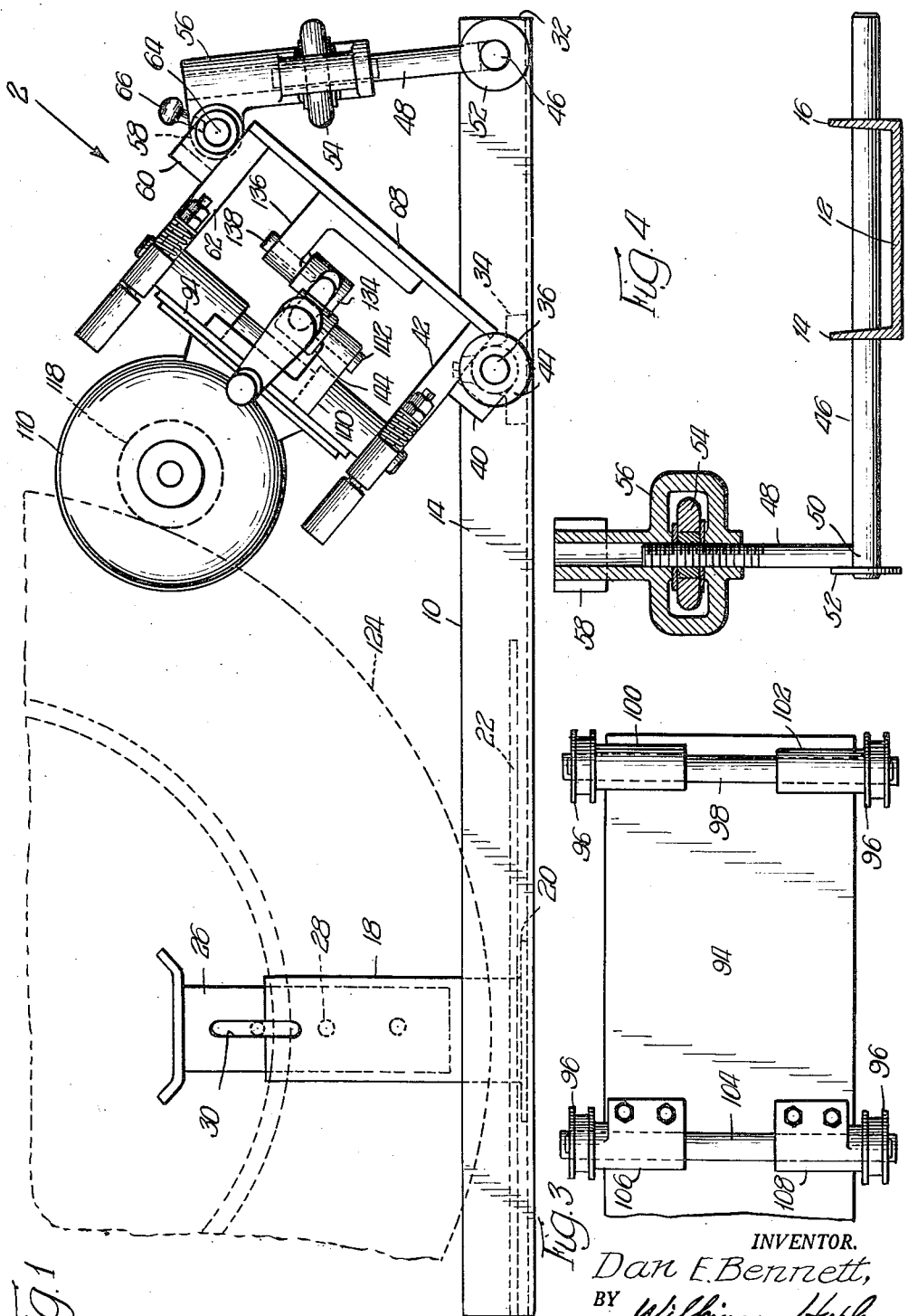
Figure 1 is a view in side elevation of one form of buffing or grinding machine incorporating this invention, the machine being shown in operative association with the tire and wheel of a motor vehicle.
Figure 2:
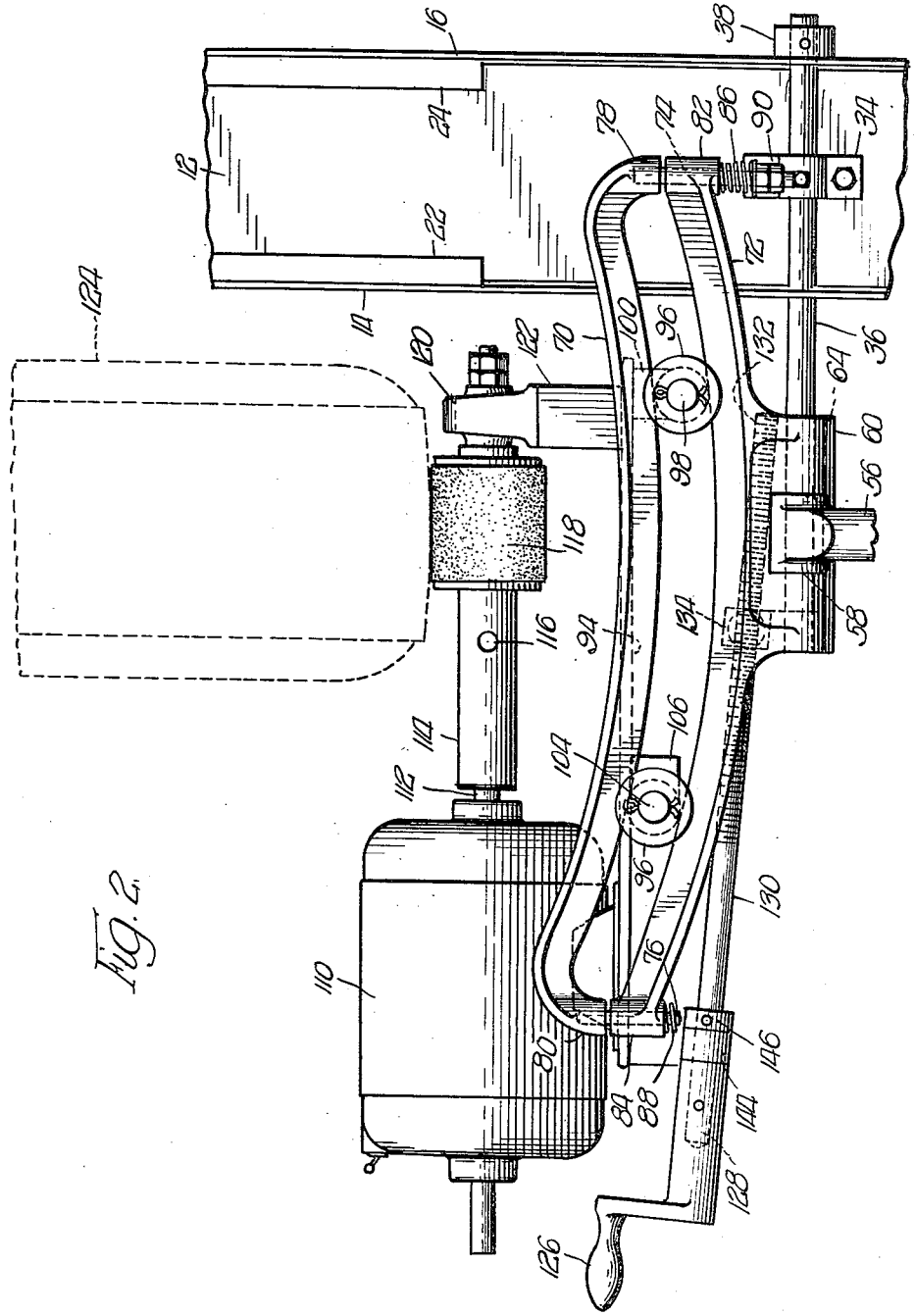
Figure 2 is a plan view from above looking in the direction of the arrow shown in Figure 1 of a fragmentary portion of the device shown in that latter figure.

Referring now to Figure 1, one form of machine embodying the invention is there shown having a base assembly 10 in the form of a relatively wide channel member having a base 12 and two upstanding parallel sides 14 and 16 as best shown in Figure 4. An adjustable jack is also provided having a body member 18 which is formed with a base flange 20 adapted to fit snugly between the upstanding arms 14 and 16 of the base assembly 10. This flange 20, in addition, is also adapted to cooperate with the two flanges 22 and 24 secured to the upstanding sides 14 and 16 of the channel base assembly 10 in spaced relation to the base 12 of that assembly, as best shown in Figures 1 and 2. The two flanges 22 and 24 permit the base 18 of the jack to be moved longitudinally of the base assembly 10 without danger of the jack body getting out of alignment therewith, or tipping. A jack head 26 is provided adapted to be telescopically received in the jack body 18, which head has a plurality of holes 28 spaced therein so that the T-shaped pin 30 can be inserted in an appropriate hole to give the jack a suitable overall height, as desired.

The flanges 22 and 24 terminate short of the end 32 of the base assembly 10 and the supporting bracket 34 for the main pivot shaft 36 is secured to the base 12 of the base assembly 10 at a point substantially midway between the ends of the flanges 22 and 24 and the end 32 of the base assembly 10. As best shown in Figure 2, the main pivot shaft 36 is journalled in this bracket 34 and also extends through suitable openings in the flanges 14 and 16. The end of the shaft associated with the flange 16 may have a collar member 38 fixed thereto, while the opposite end of the shaft 36 extends into fixed association with the pivot block 40 which is, in turn, secured to the lower guide member 42. The end of the shaft 36 not associated with the bracket 34 may have secured thereto a disc 44 acting as a support member for this end of the shaft 36.

The horizontal portion 46 of the substantially L-shaped vertical adjustment shaft 48 is likewise journalled in the upstanding flanges 14 and 16 of the base assembly 10 at the end 32 thereof, as best shown in Figure 4. The end 50 of the shaft 46 has secured thereto a disc 52 similar to the disc 44 previously described secured to the end of the shaft 36. The lower end of the vertical adjustment shaft 48 is also secured to this disc 52 so that it is disposed perpendicularly to the shaft 46. The upper end of the shaft 48 is threaded and adapted to receive the internally threaded adjusting knob 54 which is adapted to be disposed within the bracket or yoke 56, as best shown in Figure 4. The upper end 58 of the bracket 56, as best shown in Figure 2, is adapted to be received in the pivot block 60 which is secured to the upper guide 62. The bracket 56 may be pivotally secured thereto by the pin 64 which may be inserted through suitable openings in the upper end 58 of that bracket and in the pivot block 60. A suitable thumb screw 66 may be provided to lock the bracket 56 with respect to the pin 64 which is preferably non-rotatably held in the pivot block 60.

The bases of the guides 42 and 62 are secured in spaced relation to opposite sides of the bottom plate 68, as best shown in Figure 1. The structure just described therefore permits the assembly associated with and including the guides 42 and 62, and the bottom plate 68, to be adjusted to any desired angle with respect to the base assembly 10, within the limits of the movement of the adjusting knob 54 on the threaded portion of the shaft 48.

As best shown in Figure 2, the guides 42 and 62 are made up of an upper section 70 and a lower section 72, each having an arcuate configuration and normally held in alignment with each other by the pin members 74 and 76. These pins 74 and 76 are secured in the end 78 and 80 respectively of the upper portion 70 of the guides and are adapted to be slidably received in the collar portions 82 and 84 respectively formed at the two ends of the lower portion 72 of the guides. The spring members 86 and 88 are inserted over the outer extremities of the pins 74 and 76 and are held in compressed relation by a nut assembly 90, such an assembly being shown only on pin 74, since pin 76 is broken away to show additional parts. The force exerted by the compressed springs 86 and 88 normally urges the upper portion 72 of the guide into close abutment with the lower portion 70 thereof.

A motor plate 94 may be provided as best shown in Figure 3 having two pairs of flanged rollers 96 mounted thereon, one pair being mounted on the shaft 98 secured to the base of the motor plate 94 by the brackets 100 and 102, and the other pair being mounted on the shaft 104 which is in turn secured to the underside of the plate 94 by the brackets 106 and 108. The size of the motor plate 94 and the disposition of the flanged rollers 96 is such that they are adapted to fit within the two halves of the guides 42 and 62, as best shown in Figure 2, with the inner edges of the two portions 70 and 72 of the guides acting as tracks for the rollers 96 on each side of the motor plate 94. By this arrangement, it will be seen that the motor plate 94 can be moved in an arcuate path as the rollers 96 move within the guides 42 and 62.

The motor plate 94 has secured to its upper surface a motor 110. The shaft 112 of the motor 110 has a spindle 114 secured thereto by the pin 116 and the spindle 114 in turn has mounted thereon a grinding or buffing wheel 118. The outer extremity of the spindle 114 is supported by suitable bracket 120 which is mounted on a supporting block 122, in turn secured to the motor plate 94. This entire assembly, just described, is therefore mounted securely on the motor plate 94 and can be moved with that plate as the rollers 96 track between the two portions 70 and 72 of the guides 42 and 62. Such movement of the motor plate 94 and the assembly secured thereto will also cause the grinding or buffing wheel 118 to move in an arcuate path, the configuration of which is determined by the shape of the guides 42 and 62. These latter two members can be designed so that the grinding wheel will follow a path comparable to the cross sectional configuration of a conventional vehicle tire, such as the tire 124 shown in dotted lines.

In order to provide for the controlled movement or feeding of the grinding or buffing assembly supported on the plate 94, a driving or feeding mechanism therefor is provided operable by rotation of the crank member 126. The crank member 126 is secured to one end 128 of the feed screw 130, the opposite end 132 of the feed screw being threaded. This end 132 is adapted to cooperate with the nut 134 pivotally mounted on the bracket 136 secured, in turn, to the bottom plate 68 connected between the guides 42 and 62, as best shown in Figure 1. The pivotal mounting of the nut 134 is accomplished by the pin 138. The bracket 140 secured to the undersurface of the motor plate 94 is mounted in association with the opposite end 128 of the feed screw 130 and has pivotally mounted thereon by the pin 142 the collar 144 through which the end 128 of the feed screw 130 is adapted to be journalled as best shown in Figure 2. A second collar 146 is secured to the feed screw 130 in association with the collar 144 so that the feed screw cannot be moved longitudinally relative to the collar 144. This arrangement results in the motor plate 94 being driven by longitudinal movement of the feed screw 130 which is in turn accomplished by threading the threaded end 132 of the feed screw 130 into or out of the nut 134. Since the nut 134 is fixed relative to the plate 68, except for pivotal movement, threading the feed screw 130 into or out of the nut 134 will necessarily cause the collar 144, the associated bracket 140 and the plate 94, together with the motor and grinding wheel assembly mounted thereon, to move relative to the other portions of the machine, as previously described.

The operation of the machine is quite simple. The vehicle having the tire thereon which is to be treated is first raised with a conventional jack or lift device and the base assembly 10 is placed under the vehicle in association with the appropriate wheel. The jack head 26 is adjusted to a suitable height by inserting the pin 30 in one of the openings 28. The jack body 18 is moved relative to the base assembly 10 so that when the vehicle is lowered into association with the jack head 26, it will be under the A frame at the outer edge thereof, in the case of a front vehicle wheel of the conventional type, or if a rear tire is being treated under the axle or rear housing.

Disposition of the jack 18 relative to the base assembly 10 and of the base assembly itself should be such that the buffing or grinding wheel 118 is brought into close association with the tire to be treated. The buffing or grinding wheel 118 should preferably be in substantially the center of its arcuate path of travel as shown in Figure 2 when this initial adjustment is made. Likewise the grinding wheel 118 should be brought into alignment with substantially the center line of the tire 124 by adjustment of the entire machine as it is being placed in alignment with the tire 124 and the vehicle to which that tire is secured. After this adjustment has been made, the grinding wheel 118 may be brought into operative association with the tire 124 by adjustment of the knob 54 which will cause the entire assembly mounted on the plate 68 and the guides 42 and 62 to pivot about the shaft 36 as previously described. The assembly can be locked in the selected position of adjustment by tightening the thumb screw 66.

The tire is revolved by hand into the grinding wheel in a direction opposite to that which the latter revolves, and any high spots on the tire will thus be removed by operation of the grinding wheel. The tire 124 is normally revolved through one revolution with the grinding wheel 118 set at a particular point of the periphery of the tire, and then by revolving the crank 126 the position of the grinding wheel 118 can be altered in a lateral direction so that the grinding process may be repeated. In this fashion the entire surface of the tire which comes in contact with the road may be accurately shaped and the tire given a perfect running balance.

It is obvious that the drawings illustrate the device in association with a tire on the right hand side of a vehicle, if it is assumed that the machine is placed so that the grinding wheel 118 is adjacent the front of the tire. When operating on tires on the opposite side of the vehicle, the machine may be placed so that the wheel 118 is associated with the rear of the tire, the machine operating equally well in either position.

In the drawing and specification, there has been set forth a preferred embodiment of the invention, and although specific terms are employed, they are used in a generic and descriptive sense only and not for purposes of limitation. Changes in form and in the proportion of parts, as well as the substitution of equivalents are contemplated, as circumstances may suggest or render expedient, without departing from the spirit or scope of this invention as further defined in the following claims.

It is claimed:

1. A machine for truing a vehicle tire comprising a supporting base, a platform having a lower end and an upper end, said lower end pivotally connected to said supporting base, means for selectively adjusting said platform relative to said supporting base comprising a lower extremity pivotally connected to said base and an upper extremity pivotally connected to said upper end of said platform, a pair of spaced parallel track members carried by said platform, said track members each having an arcuate slot therein, a second platform, supporting members for said second platform cooperatively received by said arcuate slots in said track members, so that said second platform may be moved in an arcuate path, means for controlled positioning of said second platform along said arcuate track members, a shaping wheel for truing said vehicle tire, said shaping wheel rotatably mounted on said second platform, and a prime mover for said shaping wheel.

2. A vehicle tire grinding machine comprising a supporting base, a platform having a lower end and an upper end, said lower end pivotally connected to said supporting base, means for selectively adjusting said platform relative to said supporting base comprising a lower extremity pivotally connected to said base and an upper extremity pivotally connected to said upper end of said platform, a pair of track members projecting from said platform, each having an arcuate slot provided therein, a second platform, supporting members for said second platform cooperatively received by said slots in said track members, means for driving said second platform along said track members, an abrasive wheel rotatably mounted on said second platform, and a prime mover for said abrasive wheel.

3. A vehicle tire grinding machine comprising a supporting base, a platform having a lower end pivotally connected to said supporting base, a pair of track members projecting from said platform, each having an arcuate slot provided therein, a second platform, supporting members for said second platform cooperatively received by said slots in said track members, a rotatable threaded shaft carried by said first named platform adapted to drive said second named platform along said track members, a manually operable control member for rotating said threaded shaft, a second threaded shaft member pivotally secured to one end of said supporting base, a second manually operable control member adapted to cooperatively receive said second threaded shaft member to vary the pivotal disposition of said first named platform, an abrasive wheel rotatably mounted on said second platform, and a prime mover for said abrasive wheel.

References Cited in the file of this patent

UNITED STATES PATENTS

| | | |
|---|---|---|
| 1,391,039 | Beach | Sept. 20, 1921 |
| 1,448,239 | Schuessler | Mar. 13, 1923 |
| 1,561,861 | Kmentt | Nov. 17, 1925 |
| 1,723,221 | Vandervoort et al. | Aug. 6, 1929 |
| 1,736,085 | Lint et al. | Nov. 19, 1929 |
| 2,009,524 | Schmidt | July 30, 1935 |
| 2,130,627 | Kelly | Sept. 20, 1938 |
| 2,178,665 | Janowski | Nov. 7, 1939 |
| 2,200,575 | Haskins | May 14, 1940 |
| 2,321,936 | Pollock | Jan. 15, 1943 |
| 2,366,685 | Chambers | Jan. 2, 1945 |
| 2,429,710 | D'Avaucourt | Oct. 28, 1947 |